Feb. 6, 1945. C. M. OSTERHELD 2,368,774
WATER HEATER CONTROL SYSTEM
Filed Jan. 19, 1944 2 Sheets-Sheet 2
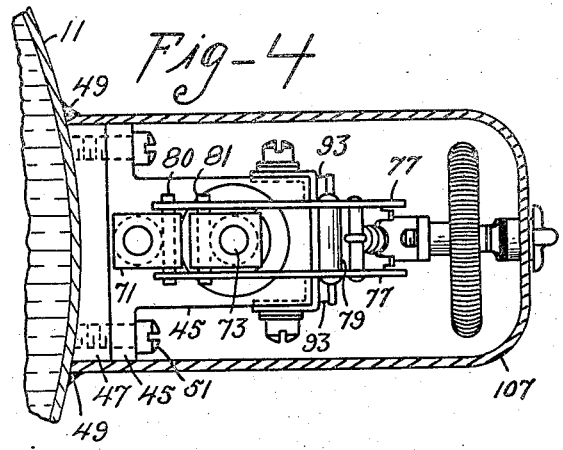
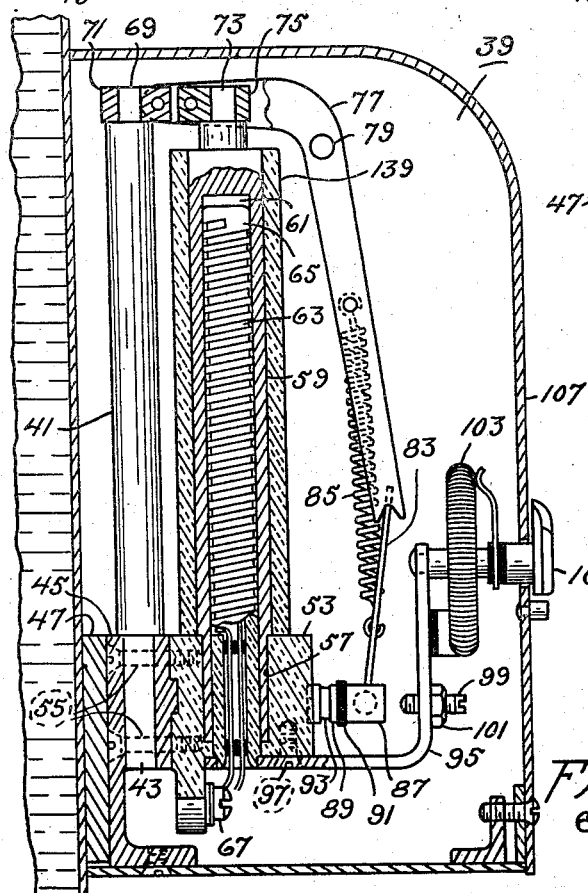
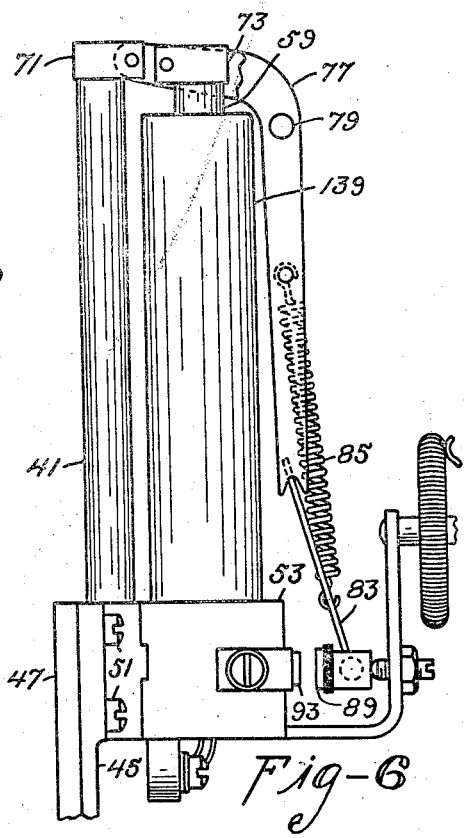
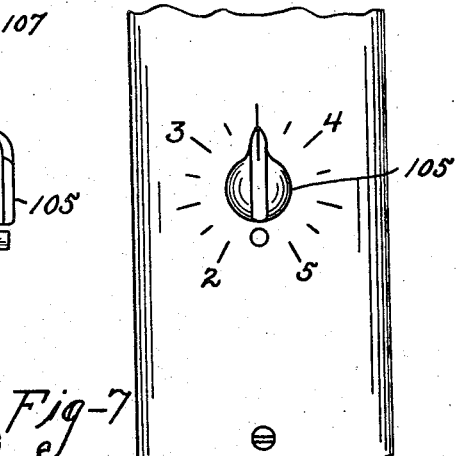
INVENTOR.
CLARK M. OSTERHELD
BY
ATTORNEY Patented Feb. 6, 1945

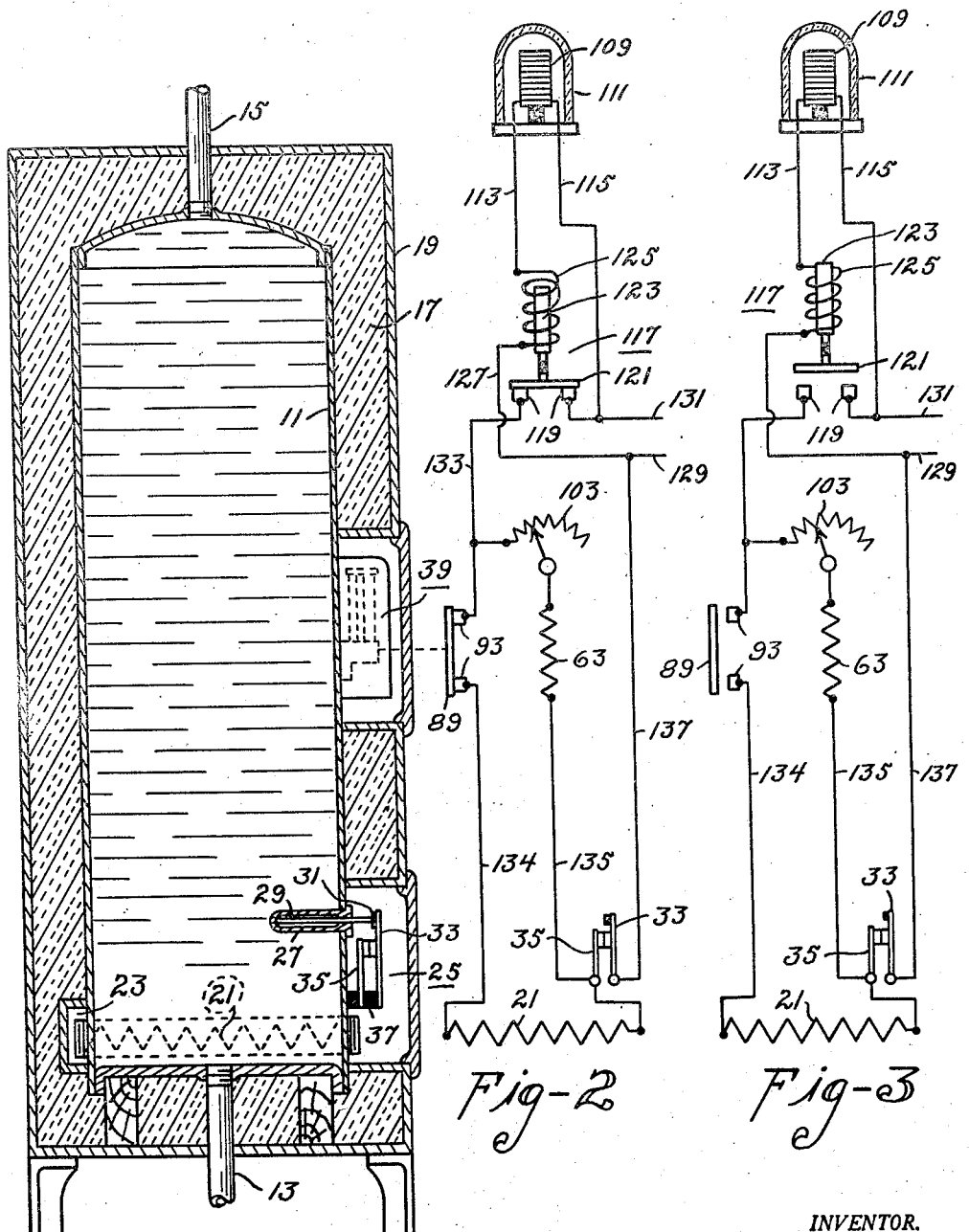

2,368,774

UNITED STATES PATENT OFFICE 2,368,774

WATER HEATER CONTROL SYSTEM

Clark M. Osterheld, Stoughton, Wis., assignor to McGraw Electric Company, Elgin, Ill., a corporation of Delaware Application January 19, 1944, Serial No. 519,074

7 Claims. (Cl. 219—39)

My invention relates to electric heating and particularly to control systems for electric water heaters.

An object of my invention is to provide a control system for an electric heater on a domestic hot water tank that shall prevent energization of the heater during daylight hours.

Another object of my invention is to provide a control system for an electric heater on a domestic hot water tank that shall selectively permit immediate energization of the heater and energization thereof with an adjustably predetermined time delay period in accordance with the amount of cold water in the tank at nightfall.

Other objects of my invention will either be apparent from a description of one form of my invention or will be pointed out in the course of such description and set forth in the appended claims.

In the drawings,

Figure 1 is a vertical, sectional view of a domestic hot water tank embodying my invention, Fig. 2 is a diagram of the electric control circuits with the contacts shown in the positions they will occupy when the tank is full of cold water and after nightfall, Fig. 3 is a diagram of the electric control circuits similar to that of Fig. 2 except that the contacts are shown in positions they will occupy when the upper portion of the tank contains hot water and the lower portion contains cold water during the daytime, Fig. 4 is a top plan view of Fig. 5 with the cover shown in section, Fig. 5 is a vertical, sectional view of a thermal retarder switch unit with the contacts in the positions they will occupy when the tank contains cold water.

Fig. 6 is a vertical plan view of Fig. 5 with cover removed and contacts shown in the positions they will occupy when the upper portion of the tank contains hot water, and, Fig. 7 is a fragmentary front view of Fig. 5 showing the time control knob.

Referring first of all to Fig. 1 of the drawings I have there shown a hot water tank 11 which is of the usual shape used in ordinary homes and which is provided with a lower cold water inlet pipe 13 and an upper hot water outlet pipe 15 and which may be surrounded by heat-insulating material 17, which latter may be held therearound by an outer casing 19.

I provide preferably, but not necessarily, a single electric heater 21 which, if only a single electric heater is used, is positioned on or in the tank 11 adjacent to the lower end portion thereof. I have shown a clamp-on heater 21 which may be located in a tunnel 23. All of these details constitute no part of my invention and variations therein may be made if desired.

I provide a first, lower thermally-actuable heater control switch designated generally by numeral 25, which includes a tubular member 27 having a closed inner end and having its open outer end secured to tank 11 through an opening therein in a fluid-tight manner. I provide an expansion rod 29 in tube 27 which is adapted to engage a lug 31 of electric-insulating material on a resilient contact arm 33. This contact arm 33 is adapted to engage with and be disengaged from a substantially rigid contact arm 35, the two contact arms being supported as by blocks 37 of electric-insulating material. While I have shown, schematically, one form of thermally-actuable heater control switch, I do not desire to be limited thereto since any other construction of thermal heater control switch effective for the same purpose and which will be in closed position when subject to cold water and will be in open position when subject to hot water, may be used. By cold water I mean water at ordinary room temperature, on the order of 65 to 70° F. and by hot water I mean water the temperature of which is on the order of 150° F. or slightly higher.

Referring now to Figs. 4 to 7 inclusive I have there shown one form of a thermal retarder heater control switch unit 39 which is preferably mounted in heat-receiving relation relatively to the tank 11 at substantially the mid-portion thereof. The thermal retarder heater control switch 39 includes a first high expansion rod 41 which is preferably made of aluminum and whose lower end portion 43 of reduced diameter is adapted to fit into an opening in a heat-conducting support 45. This heat-conducting support 45 is adapted to be bolted against heat-conducting block 47 whose inner surface is of arcuate shape and which may be held against the outer surface of tank 11 as by welding seams 49 or in any other suitable or desired manner. Support 45 may be bolted against block 47 as by short machine screws 51.

A block 53 of heat-insulating material is adapted to be secured as by machine screws 55 to support 45 and is provided with an opening 57 therein, which opening is adapted to receive the lower reduced end portion of a second, low expansion rod 59, the thermal expansivity of which may be one-half that of rod 41. The arrangement of the two rods 41 and 59 and of their respective supports is such that the two rods will extend substantially parallel with each other and with the longitudinal axis of the tank 11. The rod 59 has a bore 61 therein which is adapted to receive a heating coil 63 which may be mounted on an electric-insulating support 65. While I have shown the heating coil 63 as positioned within a bore 61, I do not desire to be limited thereto. The terminals of the heating coil 63 may be connected to contact terminals 67 which are supported on block 53. The high expansion rod 41 will have its maximum expanded length when it is at the temperature of hot water in the tank, on the order of 150° F. The low expansion rod 59 will have its maximum expanded length when its temperature is on the order of 300° F. or higher.

The upper reduced end portion 69 of the high expansion rod 41 has fixedly mounted thereon a short laterally-extending arm 71 and the upper reduced end portion 73 of the second rod 59 has fixedly mounted thereon a short arm 75, the two arms 71 and 75 extending toward each other and having their adjacent ends spaced apart a short distance. I provide a first toggle member 77 which includes a horizontal and a vertical portion. The member 77 is made up of two arms which may be spaced apart and held in proper operative relation relatively to each other by an elongated rod 79. The substantially horizontally-extending portion of toggle member 77 is pivotally supported as by a pair of trunnions 80 and 81 which are mounted in the arms 71 and 75 respectively. The upper toggle member 77 has pivotally mounted thereon at its lower end portions a second toggle member 83 and an over center spring 85 connects the intermediate portions of the upper toggle member 77 and of the lower toggle member 83 in a manner now well known in the art.

The lower end portion of the second toggle member 83 has pivotally mounted thereon a rod or block 87 which is adapted to support a contact bridging member 89 secured thereto by any suitable or desired means and insulated therefrom as by a strip 91 of electric-insulating material. Contact bridging member 89 is adapted to be engaged with and disengaged from a pair of contact terminals 93 which are secured to block 53.

I provide a bracket 95, of substantially L-shape which is adapted to be secured to block 53 as by machine screws 97 and mount thereon a stop screw 99 to limit the movement of the lower toggle member 83 when disengaged from the contact members 93. Stop screw 99 may be held in adjusted position by a lock nut 101.

I provide also an adjustable rheostat 103 which may be mounted on the upper end of the vertically-extending arm of bracket 95, which rheostat has an adjusting knob 105 thereon positioned outside of a cover 107 for the thermal retarder heater control switch unit so that the amount of resistance in the circuit may be adjusted as desired.

The closed position of the thermal retarder switch, shown in Fig. 5, will be occupied when the thermal retarder is subject to cold water and also when it is subject to hot water and the temperature of the second rod 59 is on the order of 300° F. The thermal retarder switch will be in its open position, as shown in Fig. 6 when the high expansion rod 41 is subject to hot water and the low expansion rod 59 is at ordinary room temperature or is appreciably below its maximum operating temperature, as by reason of insufficient length of time of energization of the heating coil 63, which may be from four to six hours.

The thermal retarder unit is disclosed and claimed in my copending application S. N. 511,387, filed November 22, 1943, and assigned to the same assignee as is the present application.

I provide further a light sensitive element which is here shown schematically as including a selenium cell 109. While I have shown and will describe the operation of my system when it includes a selenium current-traversed cell, I do not desire to be limited thereto since I may use a photo-electric tube in place thereof. The selenium cell 109 may be located in a transparent casing 111 and may have conductors 113 and 115 connected thereto. The light sensitive element is positioned so that it is subject to daylight and darkness, preferably outside of the house or other building in which the tank 11 is located.

I provide further an electromagnetic heater control switch 117 which includes a pair of fixed contact members 119, a contact bridging member 121 which is insulatedly connected to a core or armature member 123 adapted to be magnetized by a coil 125. Conductor 113 is connected to one terminal of coil 125, the other terminal of which is connected by a conductor 127 to a supply circuit conductor 129. A second supply circuit conductor 131 is connected to one of the fixed contact terminals 119, the other fixed contact 119 being connected by a conductor 133 with one terminal of the adjustable rheostat 103 and with one of the contact terminals 93. The second terminal 93 is connected by a conductor 134 to one end of electric heater 21, the other end of which is connected to the substantially rigid contact arm 35. A conductor 135 connects rigid contact arm 35 with one terminal of heating coil 63, the other terminal thereof being connected to the other terminal of rheostat 103. The supply circuit conductor 129 is connected by a conductor 137 with resilient contact arms 33 of the lower thermal heater control switch 25.

Fig. 2 of the drawings shows the positions of the various parts of the control system embodying my invention during the night hours when the selenium cell will not permit the flow of current with the result that contact bridging member 121 will be in engagement with fixed contacts 119. Contact bridging member 89 is shown in the position which it will occupy when the thermal retarder heater control unit is subject to cold water and when the heating coil 63 has been energized less than a predetermined length of time. If the tank is full of cold water, the lower thermal heater control switch 25 will also be in closed position and Fig. 2 therefore is based upon the condition that the amount of cold water in tank 11 is either the entire tankful or say three-quarters full.

Referring now to Fig. 3 of the drawings, I have there illustrated the positions occupied by the parts of my control system when the tank contains only enough cold water to surround the tube 27 and during daylight hours. In this case the selenium cell 109 will permit the flow of current therethrough with the result that contact bridging member 121 will have been moved out of engagement with fixed contact terminals 119. Since the thermal retarder heater control switch unit is not subject to cold water, contact bridging member 89 thereof will be out of engagement with fixed contact terminals 93.

This condition, particularly the open light-controlled electromagnetic heater control switch, will continue throughout substantially all of the daylight hours irrespective of the amount of cold water which has been drawn into the tank because of the withdrawal of hot water therefrom during such daylight hours. Even though such an amount of hot water is withdrawn during daylight hours that the thermal retarder switch, and particularly the high expansion rod 41 thereof, is subject to cold water which will cause engagement of contact bridging member 89 with terminals 93, no energization of either electric heater 21 or of heating coil 63 can be effected because of the disengagement of contact bridging member 121 from fixed terminals 119.

Let it be assumed that at nightfall when the contact bridging member 121 will engage terminals 119, enough cold water is in the tank to subject the thermal retarder unit to cold water so that energization of heater 21 will be effected at once. Energization of heating coil 63 of the thermal retarder unit is also effected, and for illustrative purposes it may be assumed that the adjustment of rheostat 103 is such that the amount of current traversing heating coil 63 is such that the maximum temperature of the low expansion rod 59 will be effected in say four or five hours. Heating up of the water in the tank will now take place, starting, as above set forth, at nightfall; and it is possible that energization of the water in the tank will continue at such a rate that the thermal retarder unit will be subject to hot water before the full temperature rise of the second expansion rod 59 with the result shown in Fig. 6 of the drawings, namely, the opening of the thermal retarder switch and attendant deenergization of heater 21. The energization of heating coil 63 will, however, continue, and at the end of an adjustably predetermined time, the second expansion rod 59 will have its temperature raised to a value of 300° or above, with the result that contact bridging member 89 will again be moved into engagement with terminals 93, with the result that energization of heater 21 will again be effected and will continue until substantially all of the water in the tank is hot when expansion rod 29 of thermal switch 25 will be subject to hot water and will have an increased length sufficient to cause disengagement of contact arm 33 from rigid contact arm 35 with consequent deenergization of the entire control system.

The design and construction of the thermal retarder switch unit includes a heat-insulating outer casing 139 so as to thermally insulate the second low expansion rod 59 from the first high expansion rod 41, but the rod 59 will be cooled relatively quickly upon deenergization of its heating coil 63.

Let it now be assumed that only a relatively small amount of cold water has been withdrawn from the tank during daylight hours, with the result that switch 25 is in closed position, as shown for instance in Figs. 1 and 3 of the drawings, but that the thermal retarder switch unit is subject to hot water so that its contact bridging member 89 occupies the position shown in Figs. 3 and 6. After nightfall, contact bridging member 121 of the light-controlled electromagnetic heater control switch will be in the position shown in Fig. 2 of the drawings with the result that energization of heating coil 63 is effected with attendant heating of the second expansion rod 59. If desired, the adjustment of rheostat 103 may be such that it will require say six hours until the maximum operating temperature of the second expansion rod 59 has been reached with the attendant result of movement of contact bridging member 89 into engagement with the fixed contact terminals 93. This will result in energization of heater 21, which energization will continue until substantially all of the water in the tank is hot when the circuit of the heater 21 will be opened by switch 25 as has already been hereinbefore set forth. It is obvious that the time of heating up of the second expansion rod 59 may be made such that the time delay period of energization of heater 21 will be so long as to fall within the usual off-peak periods which are generally considered to start at or about 11 p. m. or midnight and to extend to about 6 a. m.

It is therefore obvious that my improved water heater control system includes means for preventing energization of the heater during daylight hours and that it provides means for immediately energizing the heater after nightfall in case of withdrawal of relatively large quantities of hot water from the tank during daylight hours or energization of the heater with a predetermined and adjustable time delay period in case only relatively small quantities of hot water were withdrawn from the tank during daylight hours.

Various modifications may be made in the system embodying my invention without departing from the spirit and scope thereof, and all such modifications coming clearly within the scope of the appended claims shall be considered as covered thereby.

I claim as my invention:

1. A water heater control system for a domestic hot water tank having an electric heater and comprising a first thermally-actuable heater control switch subject to tank water temperature at the lower end portion of the tank and adapted to be closed when subject to cold water, a second thermally-actuable heater control switch in series electric circuit with said first switch and subject to tank water temperature at an intermediate portion of the tank, a third heater control switch in series circuit with said first and second switches, an electric heating coil controlled by said first and said third switches to cause closing movement of said second switch with a predetermined time delay period in case said first switch is subject to cold water and said third switch is closed and light sensitive means controlling said third switch and causing it to remain open when said light sensitive means is subject to a predetermined amount of daylight to prevent energization of said heater during daylight hours.

2. A water heater control system for a domestic hot water tank having an electric heater and comprising a first thermally-actuable heater control switch subject to tank water temperature at the lower end portion of the tank and adapted to be closed when subject to cold water, a second thermally-actuable heater control switch in series electric circuit with said first switch and subject to tank water temperature at an intermediate portion of the tank, a third heater control switch in series circuit with said first and second switches, light sensitive means controlling said third switch to cause it to be held in open position when said light sensitive means is subject to a predetermined amount of daylight and an electric heating coil for said second switch controlled jointly by said first and third switches to cause closure of said second switch a preset length of time after nightfall in case said first switch is subject to cold water.

3. A water heater control system for a domestic hot water tank having an electric heater and comprising a first thermally-actuable heater control switch subject to tank water temperature at the lower end portion of the tank and adapted to be closed when subject to cold water, a second thermally-actuable heater control switch in series electric circuit with said first switch and subject to tank water temperature at an intermediate portion of the tank, a third heater control switch in series circuit with said first and second switches, light sensitive means controlling said third switch to cause it to be held in open position when said light sensitive means is subject to a predetermined amount of daylight and an electric heating coil for said second switch controlled jointly by said first and third switches to cause closure of said second switch immediately after nightfall in case said first and second switches are subject to cold water.

4. A water heater control system for a domestic hot water tank having an electric heater and comprising a first thermally-actuable heater control switch subject to tank water temperature at the lower end portion of the tank and adapted to be closed when subject to cold water, a second thermally-actuable heater control switch in series electric circuit with said first switch and subject to tank water temperature at an intermediate portion of the tank, a third heater control switch in series circuit with said first and second switches, light sensitive means controlling said third switch to cause it to be held in open position when said light sensitive means is subject to a predetermined amount of daylight and an electric heating coil for said second switch controlled jointly by said first and third switches to cause closure of said second switch immediately after nightfall in case said first and second switches are subject to cold water, said first switch being effective to cause deenergization of said heater when substantially all of the water in the tank is hot.

5. A water heater control system for a domestic hot water tank having an electric heater and comprising a first thermally-actuable heater control switch subject to tank water temperature at the lower end portion of the tank and adapted to be closed when subject to cold water, a second thermally-actuable heater control switch in series electric circuit with said first switch and subject to tank water temperature at an intermediate portion of the tank, a third heater control switch in series circuit with said first and second switches, light sensitive means controlling said third switch to cause it to be held in open position when said light sensitive means is subject to a predetermined amount of daylight and an electric heating coil for said second switch controlled jointly by said first and third switches to cause closure of said second switch a preset length of time after nightfall in case said first switch is subject to cold water, said first switch being effective to cause deenergization of said heater when substantially all of the water in the tank is hot.

6. A heater control system for a domestic hot water tank subject to withdrawals of varying quantities of hot water therefrom during a twenty-four hour day and having an electric heater, said system, comprising a first thermally-actuable heater control switch adapted to be subject to tank water temperature at the lower end of the tank, a second heater control switch controlled by light sensitive means and adapted to be in open position during daylight hours to prevent energization of said electric heater during daylight hours.

7. A heater control system for a domestic hot water tank subject to withdrawals of varying quantities of hot water therefrom during a twenty-four hour day and having an electric heater, said system, comprising a first thermally-actuable heater control switch adapted to be subject to tank water temperature at the lower end of the tank, a second heater control switch controlled by light sensitive means and adapted to be in closed position during the hours of darkness to restrict energization of said electric heater to the hours of darkness.

CLARK M. OSTERHELD.